(12) United States Patent
Bivolaru et al.

(10) Patent No.: US 7,414,708 B2
(45) Date of Patent: Aug. 19, 2008

(54) INTERFEROMETRIC RAYLEIGH SCATTERING MEASUREMENT SYSTEM

(75) Inventors: Daniel Bivolaru, Hampton, VA (US); Paul M. Danehy, Newport News, VA (US); Joseph W. Lee, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 245 days.

(21) Appl. No.: 11/461,569

(22) Filed: Aug. 1, 2006

(65) Prior Publication Data

US 2008/0043219 A1    Feb. 21, 2008

(51) Int. Cl.
  *G01P 3/36*    (2006.01)
(52) U.S. Cl. ........................... 356/28; 356/28.5
(58) Field of Classification Search ........... 356/28–28.5
  See application file for complete search history.

(56) References Cited

U.S. PATENT DOCUMENTS

| | | | |
|---|---|---|---|
| 5,088,815 A | 2/1992 | Garnier et al. | |
| 5,333,044 A | 7/1994 | Shaffer | |
| 5,351,116 A | 9/1994 | Barton et al. | |
| 5,708,495 A | 1/1998 | Pitz et al. | |
| 6,115,121 A | 9/2000 | Erskine | |
| 6,522,397 B2 | 2/2003 | Barricau et al. | |
| 6,542,226 B1 | 4/2003 | Wernet | |
| 6,603,535 B1 | 8/2003 | McDowell | |
| 6,847,437 B2 | 1/2005 | Bruel et al. | |
| 6,856,396 B2 | 2/2005 | McGuire | |
| 2007/0242269 A1* | 10/2007 | Trainer | 356/336 |

* cited by examiner

*Primary Examiner*—Thomas H. Tarcza
*Assistant Examiner*—Timothy A Brainard
(74) *Attorney, Agent, or Firm*—Helen M. Galus (57) ABSTRACT

A method and apparatus for performing simultaneous multi-point measurements of multiple velocity components in a gas flow is described. Pulses of laser light are directed to a measurement region of unseeded gas to produce Rayleigh or Mie scattered light in a plurality of directions. The Rayleigh or Mie scattered light is collected from multiple directions and combined in a single collimated light beam. The Rayleigh or Mie scattered light is then mixed together with a reference laser light before it is passed through a single planar Fabry-Perot interferometer for spectral analysis. At the output of the interferometer, a high-sensitivity CCD camera images the interference fringe pattern. This pattern contains the spectral and spatial information from both the Rayleigh scattered light and the reference laser light. Interferogram processing software extracts and analyzes spectral profiles to determine the velocity components of the gas flow at multiple points in the measurement region. The Rayleigh light rejected by the interferometer is recirculated to increase the accuracy and the applicability of the method for measurements at high temperatures without requiring an increase in the laser energy.

18 Claims, 4 Drawing Sheets

INTERFEROMETRIC RAYLEIGH SCATTERING MEASUREMENT SYSTEM

ORIGIN OF THE INVENTION

This invention described herein was made in part by employees of the United States Government and may be manufactured and used by or for the Government of the United States of America for governmental purposes without the payment of any royalties thereon or therefor.

BACKGROUND OF THE INVENTION

1. Field of the Invention

The present invention generally relates to a method and apparatus for performing simultaneous multi-point measurements of multiple velocity components in an unseeded flow.

2. Description of Related Art

Gas flow velocity is an important parameter to measure in scientific, engineering and industrial applications. The velocity field dominates effects such as heat transfer, aerodynamics, and mass transport. Most known methods for measuring the velocity do not work in all environments and, in some cases, require undesirable modifications to the flow. For example, many known techniques require that particles or gasses be seeded into the flow.

Velocity measurement has been performed extensively using particle-based measurement techniques as mentioned above. First, particles are seeded into the flow. Then, Laser Doppler Velocimetry (LDV) or Particle Image Velocimetry (PIV) is used. However, seeding the flow with particles is undesirable since it is time consuming and increases cost. Furthermore, it is not possible to seed some flows with particles. Additionally, such particles do not always follow the gas flow, especially in supersonic and hypersonic flows and with vortices at any speed.

Molecular-based velocimetry systems use molecules rather than particles. Such molecular-based velocimetry systems include planar laser-induced fluorescence (LIF or PLIF), flow tagging velocimetry (RELIEF), CARS (Coherent anti-Stokes Raman Scattering) velocimetry, laser-induced thermal acoustics (LILA), etc. All of these molecular based known methods have disadvantages or limitations, namely, they: (i) are limited to a small class of flows, (ii) do not work well at high temperatures, (iii) cannot be used to measure three velocity components simultaneously using a single probing laser beam, (iv) sometimes requires specific molecules to be seeded into the flow, and (v) cannot be used easily to measure at multiple points.

Another known technique is iodine-cell-filtered Rayleigh scattering. This technique was developed for unseeded velocimetry in airflows and is used for two-dimensional imaging. This technique uses two cameras to view the flow. One of the cameras looks through an iodine filter. However, this technique has limitations in that the spectroscopy of the iodine is fixed and the technique does not work well at high temperatures (e.g. >1000 K). These limitations result in limited dynamic range.

Interferometric Rayleigh scattering technique for single and multiple-point velocity measurements is known in the art. However, due to low efficiency of the interferometer that is used to analyze the Rayleigh spectra, this technique is generally limited to time-averaged measurements of one component of velocity. Fabry-Perot and confocal interferometers have been used for Rayleigh signal analysis in conjunction with cooled CCDs (Charge-Coupled Devices), intensified CCDs (ICCDs), or photomultipliers arrays that image the interferogram. However, in many cases, thermal and vibration stabilization of the interferometer is required in order to improve the measurements precision in a harsh experimental environment. Furthermore, this requirement prevents those known systems from being configured as a compact system.

Another known technique can measure simultaneously three velocity components using combined instruments of different types (Rayleigh and LDV) and having different methods of obtaining the velocity. However, such a technique is complex and expensive to manufacture. Furthermore, the use of such complex components prevents this known system from being compact and configured on a single platform.

A search of patented known techniques reveals the following patents: U.S. Pat. No. 6,856,396 to McGuire discloses an airborne wind shear detection system that measures wind by determining the Doppler shift of backscattered radiation that is generated by an onboard laser system. The collected, scattered light is mixed with a sample from the transmitting laser using a dual differential Mach-Zehnder interferometer and a demodulator. U.S. Pat. No. 6,847,437 to Bruel et al. discloses a laser anemometer for determining the relative velocity between the anemometer and an ambient medium. U.S. Pat. No. 6,603,535 to McDowell discloses a stereo imaging velocimetry system and method that includes a camera for recording image processing and particle track determination. U.S. Pat. No. 6,542,226 to Wernet discloses a planar particle imaging and Doppler velocimetry system and method. The seeded flow field is illuminated with pulsed laser light source and the positions of the particles in the flow are recorded on CCD cameras. U.S. Pat. No. 6,522,397 to Barricau et al. discloses a method and a device for measuring the speed of at least one object by effect, whereby the light diffused by an object illuminated by a laser sheet is transmitted to a CCD video camera by special filtering means. U.S. Pat. No. 6,115,121 to Erskine discloses single and double superimposing interferometer systems. U.S. Pat. No. 5,708,495 to Pitz et al. discloses a method and an apparatus for determining the velocity of a gas flow wherein an image is recorded by a CCD (ICCD) camera. U.S. Pat. No. 5,351,116 to Barton et al. discloses a differential laser Doppler velocimeter that is based on the use of a modified fiber optic Sagnac interferometer. U.S. Pat. No. 5,333,044 to Shaffer discloses a florescent image tracking velocimeter (FITV) detects and measures the motion of small particles close to light scattering surfaces. The FITV includes an imaging camera. U.S. Pat. No. 5,088,815 to Gamier et al. discloses a laser device for measuring wind speeds at medium altitudes by using a Doppler effect. The device uses a Fabry-Perot interferometer.

SUMMARY OF THE INVENTION

Accordingly, it is an object of the present invention to obtain both spatial and spectral information from a gas flow to perform at least measurements of multiple velocity components.

It is another object of the present invention to provide the aforesaid measurements instantaneously and simultaneously.

It is yet another object of the present invention to provide at least multi-point measurements of multiple velocity components without requiring particles or special tracer gases to be seeded into the flow.

It is a further object of the present invention to provide an apparatus for performing at least simultaneous multi-point measurements of multiple velocity components wherein the apparatus uses a single interferometer and a single imaging device.

It is yet another object of the present invention to recirculate the Rayleigh light rejected by the interferometer to increase the accuracy and the applicability of the method for measurements at high temperatures without the requirement of increasing the laser energy.

Accordingly, the present invention is directed to an apparatus and method for performing simultaneous time-resolved, multi-point measurements of multiple velocity components in a gas flow. In one embodiment, the method comprises the steps of (a) directing pulses of laser light to a measurement region of a gas flow to produce Rayleigh or Mie scattered light in a plurality of directions wherein the Rayleigh or Mie scattered light scatters and is collected in a first direction along an optical axis and in an opposite, second direction along the optical axis, (b) collecting the Rayleigh or Mie scattered light scattered in the second direction and redirecting this collected Rayleigh or Mie scattered light so that it travels in the first direction and through the measurement region, (c) combining the laser light for reference with the collected Rayleigh or Mie scattered light to produce combined light, (d) recording interferograms of combined light, and (e) processing the spectral profiles extracted from interferograms to determine at least the velocity components of the gas flow in the measurement region. The Rayleigh or Mie scattered light is also collected from the measurement region in a third direction that is angulated with respect to the optical axis. Accordingly, in this embodiment, the method further includes the steps of collimating, redirecting, and combining the Rayleigh or Mie scattered light scattered in the third direction with the Rayleigh or Mie scattered light scattered in the first and second direction. The method includes the steps of recirculating the combined Rayleigh or Mie light rejected by the interferometer.

In one embodiment, the apparatus of the present invention comprises a laser source to emit pulses of laser light to a measurement region of a gas flow to produce Rayleigh or Mie scattered light in a plurality of directions wherein Rayleigh or Mie scattered light scatters and is collected in a first direction along an optical axis and in an opposite, second direction along the optical axis, an optical device to collect the Rayleigh or Mie scattered light scattered in the second direction and redirecting this collected Rayleigh scattered light so that it travels in the first direction and through the measurement region, a light combining device to combine laser light for reference with the Rayleigh or Mie scattered light, an interferometer to generate an interferogram that contains both spectral profiles of the Rayleigh or Mie scattered light and the reference laser light, an imaging device to record the interferogram, and a software processor to analyze the interferogram containing the combined spectral profiles to determine at least the velocity components of the gas flow in the measurement region.

A significant advantage of the present invention is that it provides efficient measurement of multiple velocity components at multiple, spatial regions in a gas flow.

Another significant advantage of the present invention is that does not require seeding of the gas with particles or molecules.

A significant feature of the present invention is that it uses a single interferometer and a single imaging device thereby decreasing costs and increasing reliability and versatility.

Another significant advantage of the present invention is that the recirculation of the light rejected by the interferometer increases the accuracy and the applicability of the method for measurements at elevated temperatures specific to combustion processes without the requirement of increasing the laser energy.

Other significant advantages of the present invention are its robustness, and improved accuracy that result from recording both spectra of the Rayleigh scattered light and the reference laser light in a single interferogram.

Other objects and advantages of the present invention will become more obvious hereinafter in the specification and drawings.

BRIEF DESCRIPTION OF THE DRAWINGS

The features of the invention are novel. The figures are for illustration purposes only and are not drawn to scale. The invention itself, however, both as to organization and method of operation, may best be understood by reference to the detailed description which follows taken in conjunction with the accompanying drawings in which.

DESCRIPTION OF THE PREFERRED EMBODIMENT

Figure 1:
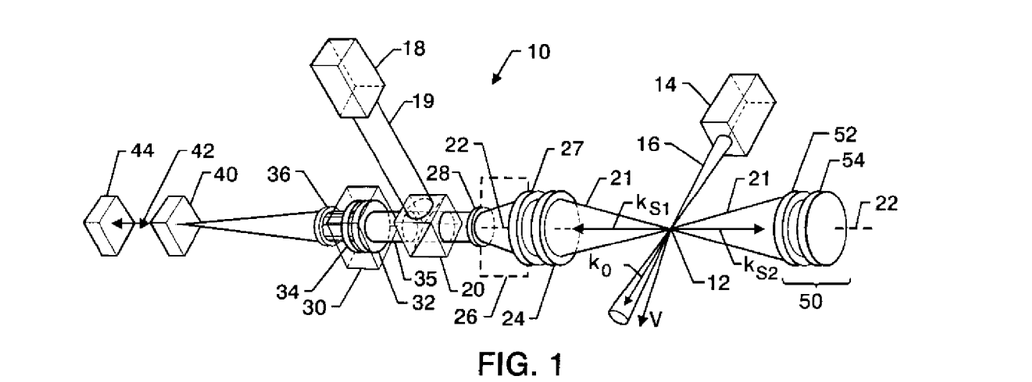
FIG. 1 is a diagram of an apparatus for performing simultaneous multi-point measurements of two orthogonal velocity components of a gas flow in accordance with one embodiment of the invention.

Referring to FIG. 1, there is shown apparatus 10 of the present invention and the corresponding scattering geometry. Apparatus 10 performs multi-point measurements of two components of velocity of a gas flowing through measurement region 12. Apparatus 10 utilizes laser source 14 that emits laser light 16. Laser light 16 is in the form of vertically polarized laser pulses. Laser source 14 is oriented so that laser light 16 is focused to measurement region 12. A reference laser source 18 generates the collimated reference laser light

19. The reference laser source 18 is obtained by collecting a small amount of laser light 16 from the laser source 14. In one embodiment, an optical fiber with collecting and collimating optics is used to provide reference laser light 19. Laser light 19 is simultaneous with laser light 16 and functions as reference laser light of zero Doppler shift. In one embodiment, laser source 14 comprises a pulsed Nd:YAG laser. Laser source 18 is oriented so that the collimated laser light 19 is directed into optical mixer 20. In a preferred embodiment, optical mixer 20 comprises a polarization dependent beam combiner. When laser light 16 is focused into measurement region 12, Rayleigh or Mie scattered light 21 is produced. Light 21 travels on optical axis 22 in the $k_{S1}$ direction and in the $k_{S2}$ direction. The Doppler shift frequency $\Delta f_1$ of the scattered light 21 in the $k_{S1}$ direction is given by equation (1):

$$\Delta f_1 = (k_{S1} - k_0) \cdot V \tag{1}$$

wherein "$k_{S1}$" and "$k_0$" are the wave vectors of the scattered and incident light, respectively, and wherein the direction of the vector $(k_{S1} - k_0)$ is the direction of the velocity component that is being measured, defined as $V_1$.

Referring to FIG. 1, apparatus 10 further comprises lens 24 and beam reducer/expander 26. In one embodiment, beam reducer/expander 26 comprises lens 27 and 28. Apparatus 10 further comprises interferometer 30. In one embodiment, interferometer 30 is configured as an air-spaced planar Fabry-Perot interferometer comprising input mirror 32 and identical output mirror 34. Interferometer 30 measures simultaneously the spatial distribution and the spectral profile of the Rayleigh scattered light 21 and the reference laser light 19. The Rayleigh or Mie scattered light 21 in the $k_{S1}$ direction is collected by lens 24. Beam reducer/expander 26 reduces the collimated beam diameter of Rayleigh or Mie scattered light 21 to match the input-aperture diameter of interferometer 30. The Rayleigh or Mie scattered light 21 collimated by the optics 26 and the collimated reference laser light 19 are mixed together in optical mixer 20 to produce mixed collimated light 35. Mixed light 35 is directed into the input of interferometer 30. In a preferred embodiment, mixed light 35 is substantially perpendicular to input mirror 32. A small fraction of mixed light 35 is transmitted through interferometer 30, but most of it, about 98%, is reflected back toward measurement region 12. As will be explained in the ensuing description, this reflected or rejected light is recirculated back to interferometer 30.

With respect to light that passes through interferometer 30, interferometer 30 analyses the spectral profile of Rayleigh or Mie scattered light 21 and the reference laser light 19 by generating an interference fringe pattern. The interference fringe pattern is focused by lens 36 and then imaged by imaging device 40 to produce an interferogram, which contains spatial as well as spectral information. Examples of interferograms are discussed in the ensuing description.

As shown in FIG. 1, in one embodiment, imaging device 40 comprises a high sensitivity cooled CCD camera. Imaging device 40 has a data bus 42 that output/input electronic data signals that represent electronic controls signals for imaging device 40 and the interferogram data. Apparatus 10 further comprises processor 44 that is in electronic data communication with imaging device 40 and receives/transmits electronic data signals 42. In one embodiment processor 44 is configured to synchronize imaging device 40 with the laser Q-switch of the laser source 14, record interferogram data, and execute image post-processing software that extracts and analyzes Rayleigh or Mie spectra from interferograms to determine at least spectral shape and the Doppler shift of the Rayleigh or Mie scattered light 21 and the velocity components. The methodology of interferogram processing software entails linearization of the concentric interference patterns from the Fabry-Perot interferogram and subsequent analysis. This particular imaging processing methodology is described in the technical article entitled "Image Processing for Interferometric Mie and Rayleigh Scattering Velocity Measurements," by Bivolaru et al., AIAA Journal, Vol. 37, No. 6, pp. 688-694, 1999, the disclosure of which article is herein incorporated by reference. Referencing the Rayleigh or Mie scattered light with un-shifted laser light 19 in a single interferogram reduces the velocity measurement uncertainty by decreasing the adverse effects of the frequency drift of laser 14, alignment errors of interferometer 30 vibrations of apparatus 10 during experiments, and background light scattering from experimental environment.

In accordance with at least one embodiment of the invention, apparatus 10 further comprises a secondary, external optical cavity that contains mirror 54 and the interferometer input mirror 32. Collection optics 50 is positioned along optical axis 22, but on the opposite side of measurement region 12. Thus, the scattering wave vector is defined by equation (2):

$$k_{S2} = -k_{S1} \tag{2}$$

Collection optics 50 comprises lens 52 and mirror 54. The light reflected by the input mirror 32 of interferometer 30 travels in the $k_{S2}$ direction along optical axis 22 and passes through measurement region 12 and is received by collection optics 50. Specifically, this light is collected and collimated by lens 52, and then reflected by mirror 54 back in the $k_{S1}$ direction. Optics 50 also collects, collimates and reflects back in the $k_{S1}$ direction the scattered light that initially was collected in the $k_{S2}$ direction upon reflection back by the input mirror 32 of the interferometer 30. Thus, the light reflected by mirror 54 now travels along optical axis 22 and back through measurement region 12. As used herein, the term "recirculated light" refers to this Rayleigh scattered light reflected or redirected by mirror 54. The light collected in the $k_{S2}$ direction shows a Doppler shift $\Delta f_2$ represented by equation (3):

$$\Delta f_2 = (k_{S2} - k_0) \cdot V \tag{3}$$

and the velocity component defined as $V_2$, is measured along the vector $(k_{S1} + k_0)$, i.e. the two measured components $V_1$ and $V_2$ are orthogonal. Unlike known measurement apparatuses and methods, the mixed light reflected or rejected by the input mirror of interferometer 30 is not lost and is recirculated back to the input of interferometer 30 by collection optics 50. Light rejected by the input of interferometer 30 is continuously recirculated back to the input of interferometer 30 until all of the recirculated light is either transmitted through interferometer 30 or lost. Such losses are typically due to absorption, scattering, and consecutive reflections in the optical components. Collection optics 50 also recirculates Rayleigh scattered light which is initially scattered in the $k_{S2}$ direction from measurement region 12 upon application of laser light pulses 16. Thus, collection optics 50 recirculates light reflected from the input of interferometer 30 as well as Rayleigh scattered light which was not reflected from the interferometer input but rather. initially scattered in the $k_{S2}$ direction from measurement region 12. The recirculated light is then collected by lens 24. Beam reducer/expander 26 reduces the beam diameter of the recirculated light to match the input-aperture diameter of interferometer 30. After the beam diameter of the recirculated light is reduced, it is directed to optical mixer 20 wherein it is mixed together with un-shifted reference laser light 19. Optical mixer 20 outputs mixed light 35 that is directed to input interferometer 30 as described in the foregoing description. Interferometer 30 produces an interference fringe pattern that is focused by lens 36, imaged by imaging device 40 and then processed by processor 44 to determine the spectral profile, and calculate velocity.

Figure 2A:
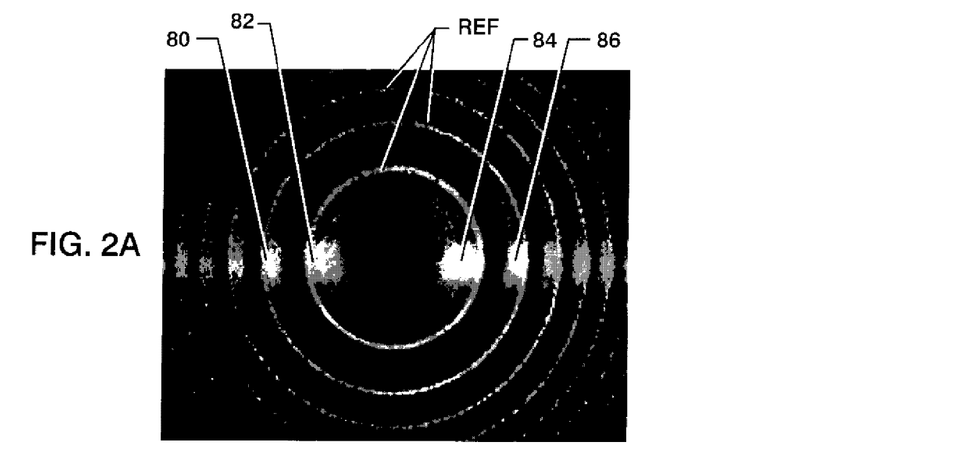
FIG. 2A is a single pulse interferogram of Rayleigh scattered light and the reference laser light, the Rayleigh scattered light corresponding to multi-point measurement of one component of velocity.
Figure 2B:
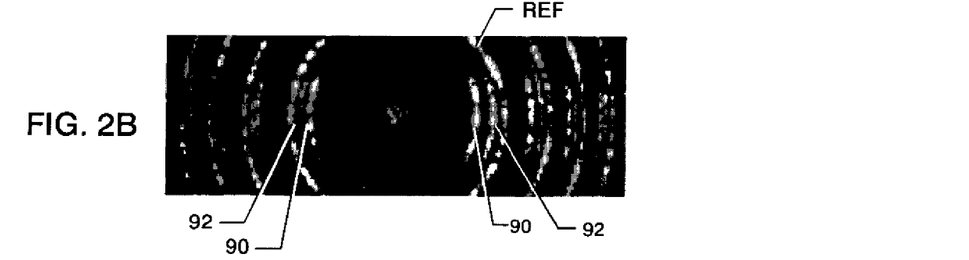
FIG. 2B is a single pulse interferogram of Mie and Rayleigh scattered light and the reference laser light, the Mie and Rayleigh scattered light corresponding to multi-point measurements of two orthogonal components of velocity in a gas flow.
Figure 2C:
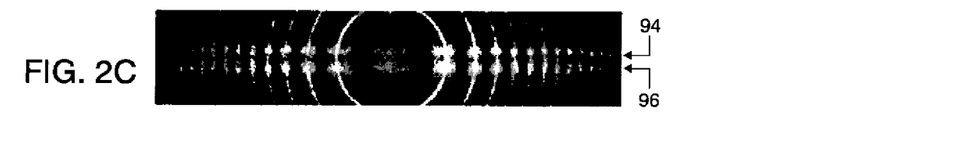
FIG. 2C is another single pulse interferogram of Rayleigh scattered light and the reference laser light, with the Rayleigh scattered light corresponding to multi-point measurements of two orthogonal components of velocity in a gas flow.
Figure 3:
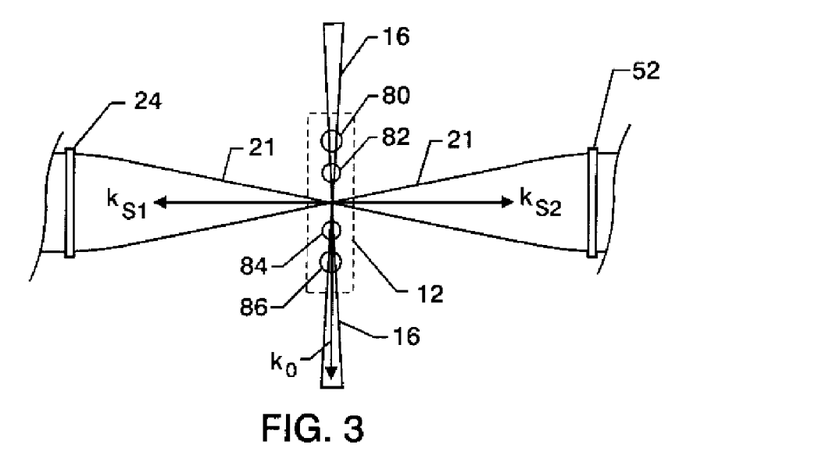
FIG. 3 is a diagram illustrating a plurality of points in the measurement region at which measurements of velocity are taken.

Three examples of interferograms obtained with apparatus 10 are shown in FIG. 2A-C. In FIG. 2A, the interferogram shows Doppler-shifted Rayleigh scattering representing multi-point measurement of one component of velocity in supersonic airflow. The Rayleigh scattered light represented by a horizontal pattern of fringes, is obtained simply by detuning or removing mirror 54. Each fringe along the horizontal line pattern corresponds to a point 80, 82, 84 and 86 at measurement region 12 as shown in FIG. 3. The concentric ring pattern "REF" represents the interference pattern of the laser light 19 used as reference. The purpose of this figure is to show the additional instrument capability to measure only one component of velocity at multiple points. If mirror 54 is oriented perpendicular to optical axis 22, the scattered light from both collecting directions overlap in a single fringe pattern similar with that shown in FIG. 2A. If the velocity components are not too different in magnitude, then the fringe pattern corresponding to different collecting directions cannot be separated spectrally resulting in an ambiguity in the measurement. However this ambiguity can be removed if the measurement test is designed so that one measured velocity component is always significantly greater than the other velocity component (significantly different Doppler shifts). For example, the axial velocity component in a high-speed jet is typically much larger than the radial component. To clarify, FIG. 2B shows an example of an interferogram obtained from predominantly Mie scattering from water clusters generated naturally in a flow with the recirculating system having the mirror 54 oriented perpendicular to the optical axis. In this interferogram, a close-up view of the first four fringe patterns, evidently the unambiguous Doppler-shifted fringes 90 and 92, are the result of overlapping scattered light from both collecting directions.

Another way to remove the aforesaid ambiguity is by slightly detuning mirror 54 in the vertical direction at the expense of losing recirculation. The new interferogram, with ambiguities removed, is shown in FIG. 2C. The interferogram shows Rayleigh scattering representing simultaneous multi-point measurement of two components of velocity in a stagnant air. Each fringe pattern 94 and 96 situated symmetrically around the center of the interferogram represents one measurement direction. In tests of the present invention, the distance between measurement points 80 and 82 was 0.2 mm, the distance between measurement points 82 and 84 was 0.5 mm, and the distance between measurement points 84 and 86 was 0.2 mm.

EXAMPLE

Figure 4:
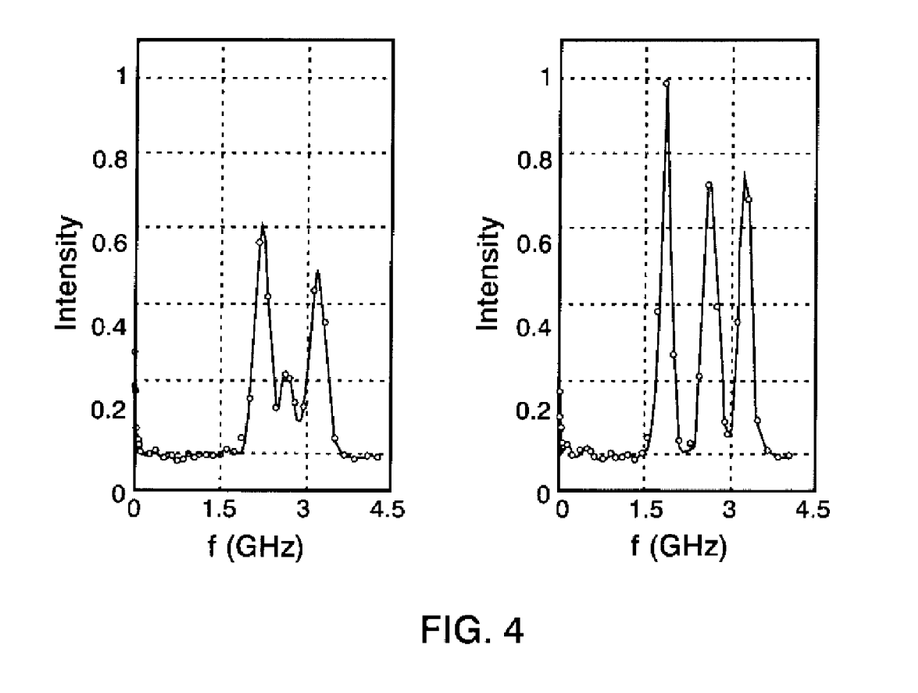
FIG. 4 shows spectra of Doppler shifted Mie and Rayleigh light scattered from water clusters generated naturally in a flow measured simultaneously at two points.

Referring to FIG. 2B, in order to compute the flow velocity, five rows were averaged through the center of the interferogram as described in the technical paper entitled "Intracavity Rayleigh-Mie Scattering For Multipoint, Two-Component Velocity Measurement," by Bivolaru et al., Optics Letters, Vol. 31, No. 11, pp. 1645-1647, June, 2006, the disclosure of which article is herein incorporated by reference as if set forth in its entirety. This data was converted from the spatial domain (pixels) to the frequency domain. Two spectra processed in this way are shown in FIG. 4. Specifically, FIG. 4 shows spectra of Mie scattering from water clusters generated naturally in the flow.

Gaussian peaks were fitted to the five-row average slice to determine with sub-pixel resolution the location of the peaks and frequency. The low frequency peak, slightly above 3.0 GHz in the spectrum, is the reference laser frequency used to identify the zero-velocity fringe location. The first peak in each spectrum is the Doppler shifted peak associated with the $V_1$ component and the middle peak with the $V_2$ component. The two sets of peaks (corresponding to the left and right sides of the interferogram in FIG. 2B) show the simultaneous measurement at two points in the flow situated at about 0.5 mm apart. The calculated Doppler shifts of the peaks are 0.98 GHz (left) and 1.38 GHz (right) for the $V_1$ component, and 0.53 GHz (left) and 0.60 GHz (right) for the $V_2$ component. These frequency shifts correspond to velocity measurements of 370, 520, 200, and 230 m/s respectively. The error in determining these frequencies is influenced by the measurement of the free spectral range of the interferometer but is dominated by the errors during data extraction from the interferogram and during spectra fitting. The significantly different Doppler shifts at these two locations situated at about 0.5 mm apart prove the system's capability for simultaneous multi-point measurements. In principle, the next outer fringe patterns can also be analyzed for velocity, but with reduced resolution.

Figure 5:
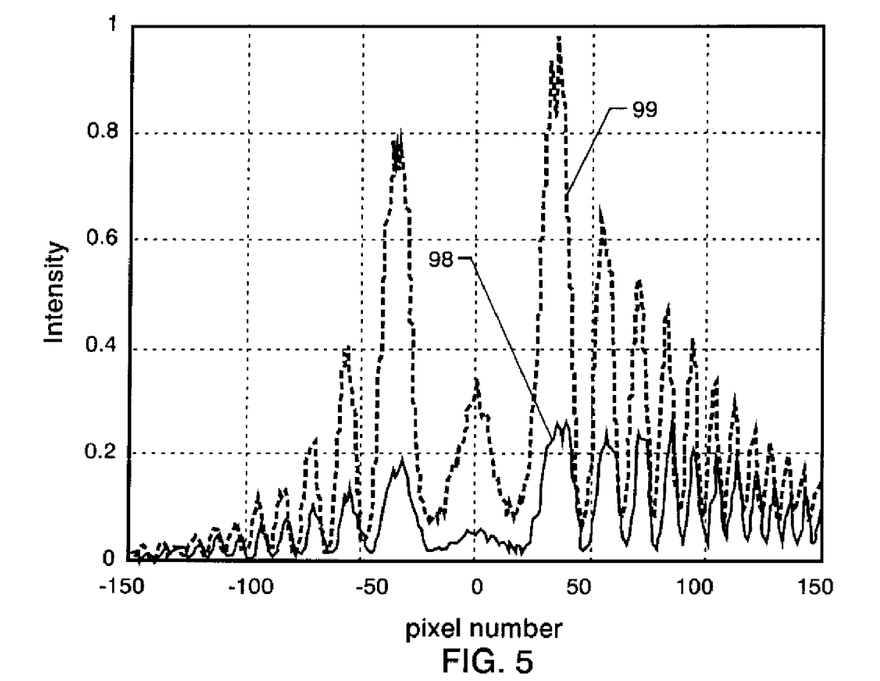
FIG. 5 is a graph comparing the Rayleigh spectrum corresponding to a single component of velocity, and the Rayleigh spectrum corresponding to simultaneous measurement of two components of velocity using optics to recirculate light rejected by the interferometer.

Referring to FIG. 5, there is shown a comparison of the Rayleigh spectrum for measurement of one component of velocity, indicated by curve 98, and the Rayleigh spectrum for simultaneous measurement of two components of velocity using collection optics 50, represented by curve 99. The measurement of one component of velocity is performed with apparatus 10 by detuning or removing optics 50. Recirculating the light rejected by input mirror 32 of interferometer 30 increased the total number of photons reaching the detector by nearly 3.5 times. The maximum intensity per pixel detected for each velocity component increased by 81%.

Further testing of apparatus 10 demonstrated that the precision of the measurements performed by apparatus 10 is 11 m/s for Rayleigh and slightly lower for Mie scattering, based on one (1) standard deviation over fifty consecutive measurements (at 10 Hz) of one component of velocity in stagnant air (of zero velocity) at room temperature. During these tests, apparatus 10 was configured for the velocity range of up to 2820 m/sec, so the resulting precision is less than 1% of the measurement range of apparatus 10. Measurements performed with apparatus 10 in an atmospheric pressure flame near zero velocity show that the spectral peaks are resolvable and that signal-to-noise is sufficiently good for velocity measurement at temperatures up to 2380 K. With increased temperatures, the measurement uncertainty increases mainly because of a decreasing number of photons reaching the detector. For temperatures up to 1600 K, the standard deviation of the velocity component being measured directly remains in the range of less than 40 m/sec, which is less than 2% of the dynamic range of the instrument. Although not too significant at higher gas velocities, another testing of apparatus 10 with increasing gas temperature revealed also a non-constant bias of the measured velocity (<30 m/sec) in flows of near zero velocity. Details can be found in the technical conference article entitled "Simultaneous CARS and Interferometric Rayleigh Scattering," by Bivolaru et al., AIAA-2006-2968, 2006, the disclosure of which article is herein incorporated by reference.

Apparatus 10 performs time-resolved multi-point measurement of two velocity components in gas flow using a single interferometer. Apparatus 10 collects Rayleigh or Mie scattered light from measurement region 12 in two opposite directions. Mirror 54 recirculates the light rejected by the input mirror 32 of interferometer 30 and the light initially scattered in the $k_{S2}$ direction thereby significantly increasing the number photons that are detected. This dramatically improves the signal-to-noise ratio, resulting in better accuracy. The use of mirror 54 allows for the simultaneous, measurement of two orthogonal components of velocity using a single interferometer 30 and a single imaging device 40. Thus, apparatus 10 can be implemented at a lower cost than known systems that use two interferometers and two cameras. Furthermore, since apparatus 10 uses fewer optical components, apparatus 10 is relatively more reliable than the aforesaid known systems. Apparatus 10 is more robust and accurate than known systems because reference laser light 19 is injected simultaneously with the Rayleigh or Mie scattered light.

Measurement ambiguities in the present invention can be removed by using pre-known estimates of the magnitudes and signs of the velocity components, or by detuning mirror 54. Apparatus 10 improves the throughput of interferometer 30, up to 3.5 times. Furthermore, apparatus 10 significantly improves the maximum intensity per pixel detected (1.81 times). Since velocity measurement accuracy increases approximately with the square root of the intensity, the present invention improves velocity measurement accuracy by a factor of the square root of 2. The simplicity and precision of apparatus 10 makes it practical for commercial and laboratory use.

Figure 6:
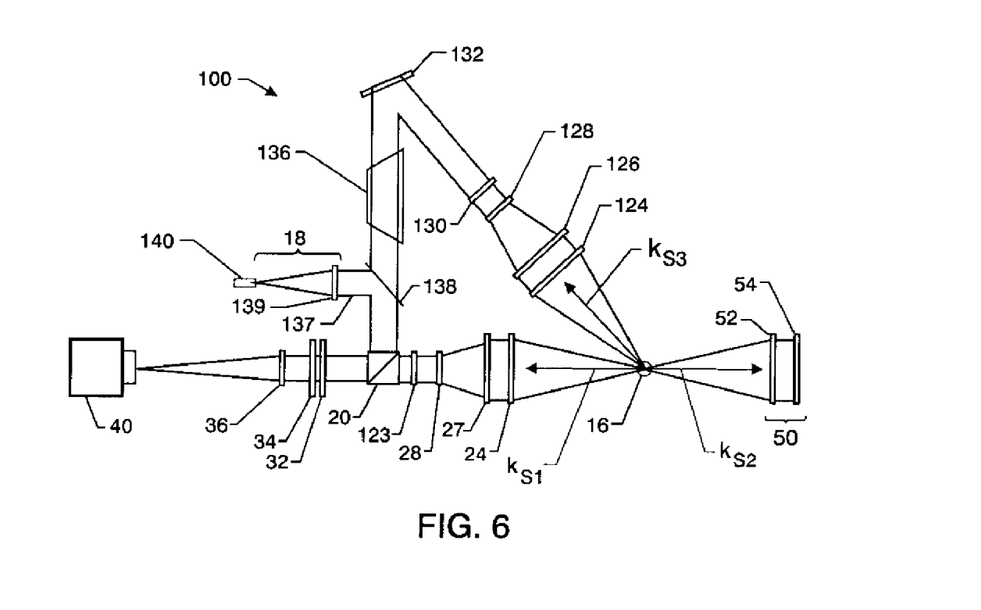
FIG. 6 is a diagram of an apparatus for performing simultaneous multi-point measurements of three components of velocity in a gas flow.
Figure 7:
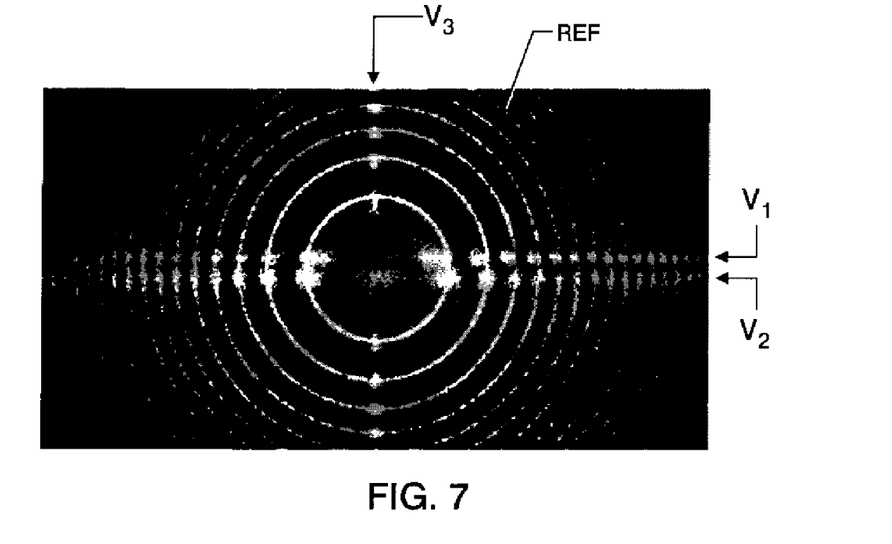
FIG. 7 is a single pulse interferogram generated by the apparatus of FIG. 6, the interferogram showing interference fringe patterns that correspond to three components of velocity in a gas flow.

Referring to FIG. 6, there is shown apparatus 100 in accordance with another embodiment of the present invention. Apparatus 100 is configured for simultaneous, multi-point measurement of three components of velocity of a gas flow. Apparatus 100 comprises apparatus 10, and additional optical devices to collect, collimate, and redirect the Rayleigh or Mie scattered light from the measurement region in a third direction along a second optical axis that is angulated with respect to the first optical axis. The measurement of two orthogonal velocity components $V_1$ and $V_2$ is performed identical as described for apparatus 10. A half-wave plate 123 is added to apparatus 10 before beam combiner 20 to rotate (if necessary) the scattered beam polarization to vertical. To measure the third component of velocity, the light is collected in the direction of the wave vector $k_{S3}$ in a plane (containing $k_{S1}$) perpendicular to the plane defined by the vectors $k_{S1}$ and $k_0$. In one example of the embodiment the angle between $k_{S1}$ and $k_{S3}$ is 33 degrees. The direction of $(k_{S3}-k_0)$ vector gives the direction of the velocity vector being measured, defined as $V_3$. This vector contains information from all three orthogonal components of velocity. The Rayleigh scattered light in the $k_{S3}$ direction is collected and collimated by lens 124. Lens 126 and 128 reduce the beam diameter to match the input aperture of the interferometer 30 as described earlier. Half-wave plate 130 rotates the beam polarization to horizontal and mirror 132 reflects the collimated beam toward the polarization-dependent beam combiner 20. Dove prism 136 rotates the laser beam image to an angle that is suitable for image processing. In one embodiment, the aforementioned angle is 90 degrees. This light is then combined or mixed using beam combiner 138 with reference laser light 137 outputted by reference laser source 18. In one embodiment, reference laser source 18 is an optical fiber 140 and an optical device 139. In one preferred embodiment optical device 139 is a lens to collimate reference light, and two cross-polarizers to adjust reference light intensity. The combined or mixed light is then directed to polarization-dependent beam combiner 20 and then toward interferometer input mirror 32. The interference fringe pattern thereafter is recorded by imaging device 40 and processed with the same image processing methodology that is also implemented by processor 44 of apparatus 10. In one example, referring to FIG. 7, there is shown a typical interferogram generated by apparatus 100. The label "REF" indicates the fringe pattern of the reference laser light. The interferogram has a pair of horizontal fringe patterns obtained by slightly tuning mirror 54 in the vertical direction (as shown also in FIG. 2C) and a vertical fringe pattern. The top horizontal fringe pattern represents the $k_1$ collecting direction and velocity component $V_1$, the bottom horizontal fringe pattern represents the $k_{S2}$ collecting direction and velocity component $V_2$, and the vertical fringe pattern represents the $k_{S3}$ collecting direction and velocity component $V_3$ that can be used to calculate the third orthogonal velocity component. The vertical and top horizontal fringe patterns that show a larger Doppler-shift of the Rayleigh scattered light are associated with a higher velocity of the component being measured, $V_3$ and $V_1$, respectively. The bottom horizontal fringe pattern shows a much lower Doppler-shift associated with near zero velocity of the second component $V_2$ being measured. In tests of apparatus 100, three components of velocity were measured simultaneously from Doppler-shifts at four points in a cold Mach 2 gas flow up to supersonic speeds, for each laser pulse at 20 Hz repetition rate and 9 nsec exposure time.

Figure 8:
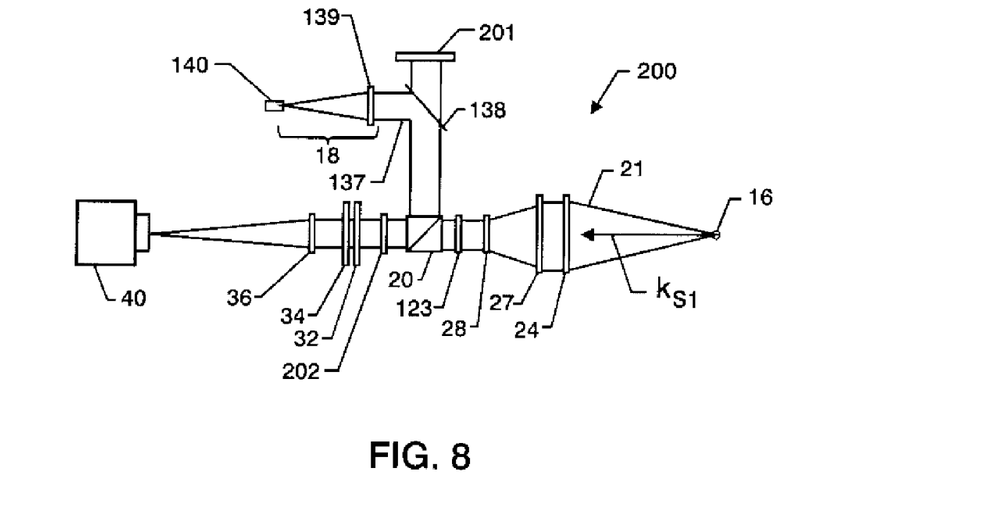
FIG. 8 is a diagram of an apparatus for performing simultaneous multi-point measurements of one component of velocity in a gas flow using light recirculation.

Referring to FIG. 8, there is shown apparatus 200 in accordance with another embodiment of the present invention. Apparatus 200 is configured for simultaneous, multi-point measurements of one component of velocity in a gas flow using Rayleigh scattered light recirculation. Apparatus 200 comprises apparatus 10, modified by removing the optical device 50 for collecting and redirecting the Rayleigh scattered light being initially scattered in an opposite, second direction along the first optical axis. Light recirculation optics 201 and 202 are added to facilitate the recirculation of the collimated scattered light beam partially rejected by the interferometer input mirror. In one example of the invention, the light recirculation optics comprises a planar mirror 201 situated on a second optical axis perpendicular to the first optical axis and passing through the polarization dependent beam splitter/combiner 20, and a quarter-wave plate 202 to modify the linear polarization of the Rayleigh scattered light beam to circular polarization. In a preferred embodiment, the vertically polarized Rayleigh scattered light that passes through beam splitter 20 is changed to circular polarization by the quarter-wave plate 202. The input mirror 32 of the planar Fabry-Perot interferometer 30 reflects most of the circularly polarized beam energy in the opposite direction on the optical axis as described earlier for apparatus 10. The beam polarization is changed thereafter to horizontal polarization by the quarter-wave plate 202, and the beam is reflected by the polarization dependent beam splitter/combiner 20 toward the recirculating mirror 201 on a second optical axis perpendicular to the first optical axis. The recirculating mirror 201 is adjusted to reflect back the horizontal polarized beam in opposite direction on the second optical axis toward the polarization dependent beam splitter/combiner 20. Therefore, the polarization dependent beam splitter/combiner 20 receives for the second time and directs the Rayleigh scattered light beam on the initial first optical axis toward the interferometer 30. In the next cycle the beam polarization is rotated back to vertical polarization, the beam passes through splitter/combiner 20 on the first optical axis but in opposite direction, and consequently the remaining beam energy is lost.

Measurements performed with apparatus 200 in stagnant air at atmospheric pressure and temperature show a nearly two times increase of the interferometer throughput. This is a considerable advantage since this improvement is equivalent with a reduction in laser energy of about two times, therefore, a considerable reduction in the cost of the laser source. The simplicity and versatility of the compact apparatus 200 makes it ideal for practical applications.

Thus, the present invention provides many advantages and benefits, including:

a) instantaneous measurements;
b) simultaneous multi-point measurements along a line;
c) simultaneous measurement of multiple components of velocity;
d) increased number of photons collected;
e) increased local intensity analyzed by the imaging device thereby increasing the signal-to-noise ratio;
f) improved stability and accuracy by continuous mixing of the Rayleigh scattered light with the reference laser light;
g) no seeding of the flow is required;
h) can use Mie scattering to measure velocity; and
i) measurements are not affected in reasonable limits by Mie scattering contamination of the Rayleigh spectra, laser frequency drift, interferometer alignment errors, vibrations and low levels of background light scattering.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed:

1. A method for performing simultaneous multi-point measurements of multiple velocity components in a gas, comprising:
    producing Rayleigh or Mie scattered light in a plurality of directions by directing pulses of laser light to a measurement region of a gas;
    collecting the scattered light in a first direction along an optical axis and in an opposite, second direction along the same optical axis;
    collecting the scattered light in the second direction and redirecting this collected scattered light so that it travels in the first direction and through the measurement region;
    collecting the scattered light in a third direction along a second optical axis that is angulated with respect to the first optical axis;
    combining the collected scattered light from the first and second directions along the first optical axis with the collected light from the third direction along the second optical axis;
    combining a laser light for reference with the scattered light on any of the optical axes;
    directing the combined light beam containing both the reference and scattered light from multiple collecting directions toward an interferometer;
    generating an interferogram containing both spatial and spectral information from both reference and scattered light from multiple collecting directions;
    imaging and recording the interferogram by an imaging device and;
    processing the recorded interferogram to analyze the spectra of the combined collected scattered light in relation to the spectra of the reference laser light to determine the velocity components of the gas at multiple locations in the measurement region.

2. The method according to claim 1 wherein the step of collecting scattered light further comprises collimating the collected scattered light.

3. The method according to claim 2 further comprising the step of reducing the beam diameter of the collimated light from each collecting direction.

4. The method according to claim 3 further comprising the step of, prior to the step of generating a combined interferogram, recirculating at least once the collimated light beam containing both the reference and Rayleigh scattered light from at least one collecting directions.

5. An apparatus for performing simultaneous multi-point measurements of multiple orthogonal velocity components in a gas flow using Rayleigh scattering light recirculation, comprising:
    a laser source to emit pulses of laser light to a measurement region of a gas flow to produce Rayleigh or Mie scattered light in at least two directions;
    an optical device to collect the Rayleigh or Mie scattered light being initially scattered in a first direction along an optical axis and in an opposite, second direction along the optical axis;
    an optical device to collect the Rayleigh or Mie scattered light scattered in the second direction and redirect this collected Rayleigh or Mie scattered light so that it travels in the first direction and through the measurement region;
    a device for providing a reference laser light based on the laser light provided by the laser source;
    an interferometer to generate an image of the interference fringe patterns containing spectra of both the Rayleigh or Mie scattered light and the reference laser light;
    an imaging device to record the image of the interference fringe patterns; and
    a processor to analyze the recorded image of the interference fringe patterns containing multiple Rayleigh or Mie and reference spectra to determine the velocity components of the gas at multiple locations in the measurement region.

6. The apparatus according to claim 5 wherein the optical device used to collect and redirect the Rayleigh or Mie scattered light from the second direction is configured to recirculate the Rayleigh or Mie light rejected by the interferometer.

7. The apparatus according to claim 6 wherein the optical device used to collect and redirect the Rayleigh or Mie scattered light from the second direction comprises:
    a lens to collect and collimate the light; and
    a mirror to redirect the collimated light so that it travels in the first direction through the lens and measurement region toward the interferometer on the same optical axis.

8. The apparatus according to claim 5 further comprising a light combining device to combine the reference laser light with the Rayleigh or Mie scattered light collected in the first direction and the redirected Rayleigh or Mie scattered light collected in the second direction.

9. The apparatus according to claim 8 wherein the optical device that combines the reference laser light with the Rayleigh or Mie scattered light collected in the first direction and the redirected Rayleigh or Mie scattered light collected in the second direction comprises a polarization dependent beam combiner.

10. The apparatus according to claim 5 wherein the interferometer comprises a planar Fabry-Perot interferometer.

11. The apparatus according to claim 5 further comprising devices for reducing the beam diameter of the combined collected Rayleigh scattered light and reference laser light so that it matches the input aperture of the interferometer.

12. The apparatus according to claim 5 further comprising:

an optical device to collect the Rayleigh or Mie scattered light from the measurement region in a third direction along a second optical axis that is angulated with respect to the first optical axis, for performing simultaneous multi-point measurements of three velocity components;

a light combining device to combine the collected scattered light from the first and second directions along the first optical axis with the collected light from the third direction along the second optical axis;

an optical device that rotates the image of at least one of the light beams containing the scattered light from at least one collecting direction; and an optical device that rotates the polarization of at least one of the light beams containing the scattered light from at least one collecting direction.

13. The apparatus according to claim 12 wherein the light combining device comprises a polarization dependent beam combiner.

14. The apparatus according to claim 12 further comprising an optical device for reducing the beam diameter of the scattered light collected in the third direction along the second optical axis so that it matches the beam diameter of the light collimated on the first optical axis.

15. The apparatus according to claim 12 further comprising optical devices to redirect the collimated beam of the collected Rayleigh or Mie light scattered in the third direction to the light combining device.

16. An apparatus for performing simultaneous multi-point measurements of one component of velocity in a gas flow using Rayleigh scattered light recirculation, comprising:

a laser source to emit pulses of laser light to a measurement region of a gas flow to produce Rayleigh or Mie scattered light;

an optical device to collect the Rayleigh or Mie scattered light being initially scattered in a direction along an optical axis;

a device for providing a reference laser light based on the laser light provided by the laser source;

an interferometer to generate an image of the interference fringe patterns containing spectra of the Rayleigh or Mie scattered light and the reference laser light;

a light recirculation optics to effect recirculation of the collimated Rayleigh or Mie scattered light beam initially rejected by the interferometer input mirror in an opposite direction along the optical axis.

an imaging device to record the image of the interference fringe patterns; and a processor to analyze the recorded image of the interference fringe patterns to determine at least the velocity of the gas at multiple locations in the measurement region.

17. The apparatus according to claim 16 wherein the light recirculation optics comprises:

a polarization dependent beam combiner situated on the first optical axis before the interferometer input mirror;

a planar mirror situated on a second optical axis perpendicular to the first optical axis and passing through the polarization dependent beam combiner; and a quarter-wave plate placed between the polarization dependent beam combiner and the interferometer input mirror to modify the linear polarization of the light beam to circular polarization.

18. The apparatus according to claim 16 wherein the interferometer comprises a planar Fabry-Perot interferometer.

* * * * *